(12) United States Patent
Veness

(10) Patent No.: US 10,595,505 B2
(45) Date of Patent: Mar. 24, 2020

(54) BOWL ASSEMBLY

(71) Applicant: Doskocil Manufacturing Company, Inc., Arlington, TX (US)

(72) Inventor: David Veness, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 300 days.

(21) Appl. No.: 15/463,865

(22) Filed: Mar. 20, 2017

(65) Prior Publication Data
US 2018/0263211 A1    Sep. 20, 2018

(51) Int. Cl.
*A01K 1/035*    (2006.01)

(52) U.S. Cl.
CPC .................. *A01K 1/0356* (2013.01)

(58) Field of Classification Search
CPC .......... A01K 1/0356; A01K 7/00; A01K 7/02; A01K 39/02; A01K 39/026
See application file for complete search history.

(56) References Cited

U.S. PATENT DOCUMENTS

| | | | |
|---|---|---|---|
| 1,059,142 A * | 4/1913 | Gibbs ................. | A01K 39/026 119/77 |
| 1,239,151 A * | 9/1917 | Woods ................ | A01K 1/0356 119/464 |
| 1,446,740 A * | 2/1923 | Eummelen .......... | A01K 1/0356 119/464 |
| 1,450,494 A * | 4/1923 | Eummelen .......... | A01K 1/0356 119/464 |
| 1,755,706 A * | 4/1930 | St George ........... | A01K 1/0356 119/464 |
| 1,878,893 A * | 9/1932 | Rotberg ............... | A01K 39/026 119/464 |
| 2,191,811 A * | 2/1940 | Trampier, Sr. ....... | A01K 5/0135 119/51.5 |
| 2,699,752 A * | 1/1955 | Reyes .................. | A01K 1/0356 119/464 |
| 3,185,133 A * | 5/1965 | Bird ..................... | A01K 1/0356 119/477 |
| 3,776,190 A * | 12/1973 | Hurlbert ............. | A01K 1/0356 119/478 |
| 4,401,056 A * | 8/1983 | Cody ................... | A01K 5/0241 119/477 |
| 4,541,363 A * | 9/1985 | Paoluccio ............ | A01K 7/02 119/77 |
| 5,351,645 A * | 10/1994 | Brennon .............. | A01K 5/02 119/475 |
| 5,832,872 A * | 11/1998 | Pearce ................. | A01K 1/0356 119/477 |
| 5,893,338 A * | 4/1999 | Campbell ............ | A01K 1/0356 119/475 |

(Continued)

OTHER PUBLICATIONS

"GOGOKING Pet Dog Bowl Hanging Cage Dog Bowl Pet Water and Food Bowl Stainless To", www.ebay.com, Mar. 10, 2017, 6 Pages.

*Primary Examiner* — Magdalena Topolski
(74) *Attorney, Agent, or Firm* — Global IP Counselors, LLP

(57) ABSTRACT

A bowl assembly having a bowl and a fill cup. The bowl is configured to be supported on a barrier at a first barrier side. The fill cup is configured to be supported on the barrier at a second barrier side that is opposite to the first barrier side. The fill cup and the bowl being capable of being connected together through an opening in the barrier.

14 Claims, 9 Drawing Sheets

(56) References Cited

U.S. PATENT DOCUMENTS

| | | | | |
|---|---|---|---|---|
| 2001/0020449 A1* | 9/2001 | Louden | ............... | A01K 1/0356 |
| | | | | 119/51.01 |
| 2006/0065207 A1* | 3/2006 | Louden | ............... | A01K 1/0356 |
| | | | | 119/464 |
| 2012/0234250 A1* | 9/2012 | Shamoon | ............ | A01K 1/0356 |
| | | | | 119/61.57 |
| 2013/0092090 A1* | 4/2013 | McCallum | ............... | A01K 7/06 |
| | | | | 119/74 |
| 2018/0184615 A1* | 7/2018 | Ho | ........................ | A01K 7/02 |

* cited by examiner

BOWL ASSEMBLY

BACKGROUND

Field of the Invention

This invention generally relates to a bowl assembly. More specifically, the present invention relates to a bowl assembly having a fill cup.

Background Information

In some circumstances, pets can be kept inside crates, kennels and/or carriers, which can include one or more wire barriers. Similarly, a wire pet barrier can be installed into the rear compartments of vehicles to retain the pet in the rear compartment. For example, a pet carrier can include a door that is a wire barrier to secure the pet inside the carrier. A pet bowl assembly can be installed or supported onto the barrier to provide food, water and other contents to the pet.

SUMMARY

Generally, the present disclosure is directed to various features of a bowl assembly. In one feature, a pet bowl assembly is configured to be supported on a pet barrier.

One aspect is to provide a bowl assembly having with a bowl and a fill cup. The bowl is configured to be supported on a barrier at a first barrier side. The fill cup is configured to be supported on the barrier at a second barrier side that is opposite to the first barrier side. The fill cup and the bowl being capable of being connected together through an opening in the barrier.

Also other objects, features, aspects and advantages of the disclosed bowl assembly will become apparent to those skilled in the art from the following detailed description, which, taken in conjunction with the annexed drawings, discloses one embodiment of the bowl assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the pet products field from this disclosure that the following descriptions of the embodiments are provided for illustration only and not for the purpose of limiting the invention as defined by the appended claims and their equivalents.

Figure 1:
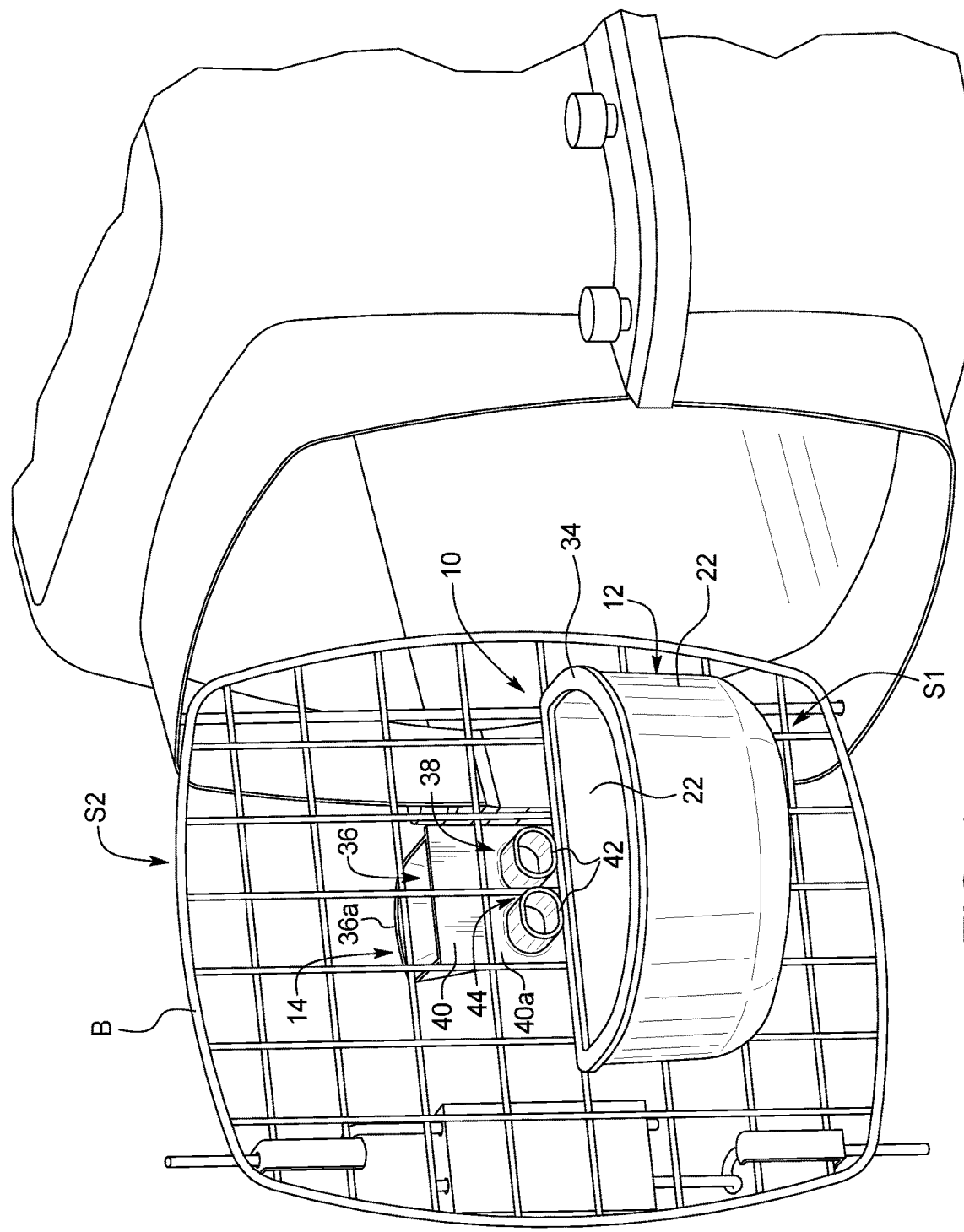
FIG. 1 is a front perspective view of a bowl assembly supported on a wire barrier in accordance with a first illustrated embodiment.

Referring now to FIG. 1, a bowl assembly 10 is provided in accordance with a first illustrated embodiment. The bowl assembly 10 comprises a bowl 12 and a fill cup 14. The bowl 12 and the fill cup 14 are configured to be attached to each other at a fastening area A of the bowl assembly 10. The bowl assembly 10 further comprises a nut 16 that is configured to be attached to the bowl 12 at the fastening area A. In the illustrated embodiment, the bowl assembly 10 is configured to be installed on a barrier B. The barrier B can include a pet crate, a portion of a pet kennel or a door of a pet carrier, as seen in FIG. 1. Alternatively, the barrier B can include a pet barrier that is installed into a vehicle inner compartment to retain a pet in a particular compartment of the vehicle. In the illustrated embodiment, the barrier B is preferably a wire barrier.

Figure 4:
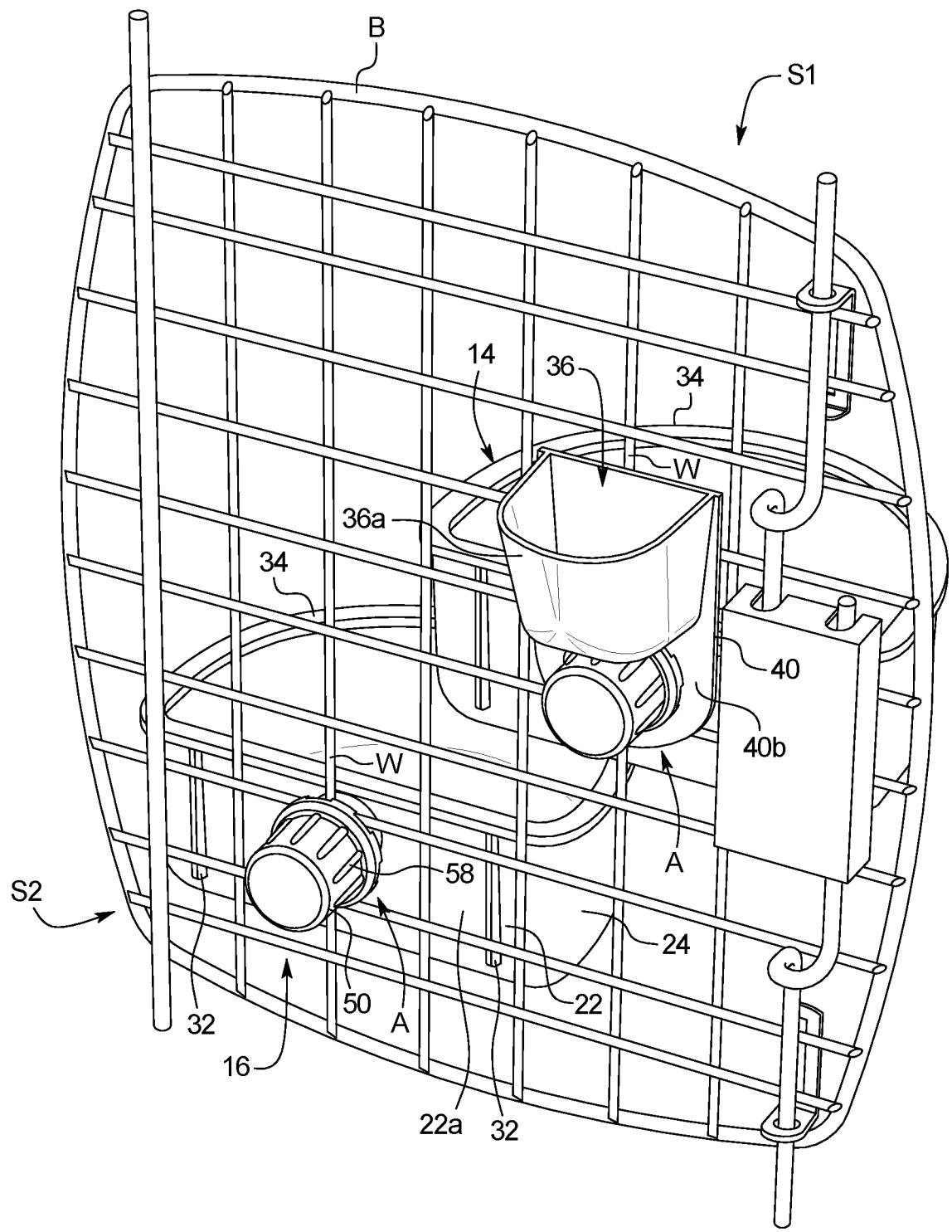
FIG. 4 is a rear perspective view of the bowl assembly of FIGS. 1 to 3 installed on a pet barrier, and a bowl installed on the pet barrier without the fill cup.

The bowl assembly 10 is configured to be supported on the barrier B such that the bowl 12 is supported at a first barrier side S1 of the barrier B and the fill cup 14 is supported at a second barrier side S2, that is opposite of the first barrier side S1. Thus, the fill cup 14 and the bowl 12 are connected at the fastening area A of the bowl assembly 10 where the bowl 12 and fill cup 14 are supported to the barrier B. In the illustrated embodiment, the fastening area A of the bowl assembly 10 includes a fastening structure 18 of the bowl 12, a receiving opening 20 of the fill cup 14 and the nut 16. Alternatively, as seen in FIG. 4, the bowl 12 can be attached to the barrier B without the fill cup 14. Thus, the fastening area A can include just the fastening structure 18 and the nut 16.

The bowl 12 will now be discussed with reference to FIGS. 2 to 5. As stated, the bowl 12 is configured to be supported on the barrier B at the first barrier side S1. The bowl 12 is a rigid member configured to contain contents such as food and water for the pet. Preferably, the bowl 12 can be injection molded plastic or any other suitable a cost-efficient material. Alternatively, the bowl 12 can be made of stainless steel that is odor resistant and easy to clean. The bowl 12 includes a side wall 22, an arc-shaped front wall 24 and a bottom wall 26. The side wall 22, the front wall 24 and the bottom wall 26 are preferably a one-piece member formed by injection molding or casting. It will be apparent to those skilled in the art from this disclosure that the bowl 12 can have many sizes and shapes to accommodate different sized barriers as needed and/or desired.

Figure 3:
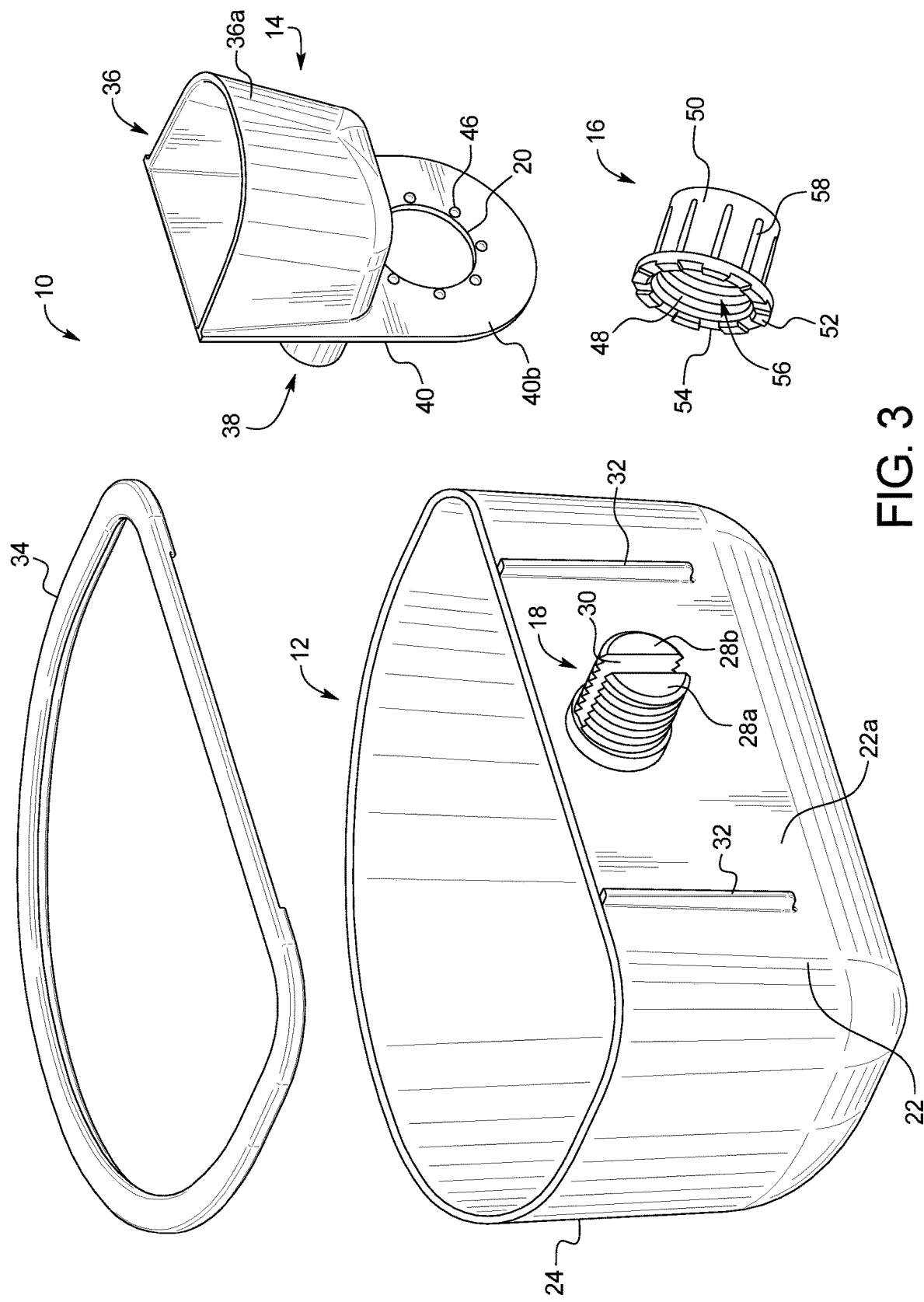
FIG. 3 is a rear perspective view of the bowl assembly of FIGS. 1 and 2, with a bowl, a nut and a fill cup shown exploded.

The bowl 12 further includes the fastening structure 18. As best seen in FIG. 3, the fastening structure 18 is disposed on an external surface 22a of the side wall 22. In the illustrated embodiment, the external surface 22a of the side wall 22 is a barrier-facing surface of the bowl 12. The external surface 22a is configured to face the barrier B when the bowl 12 is attached to the barrier B. In other words, the external surface 22a of the side wall 22 includes the fastening structure 18.

Figure 5:
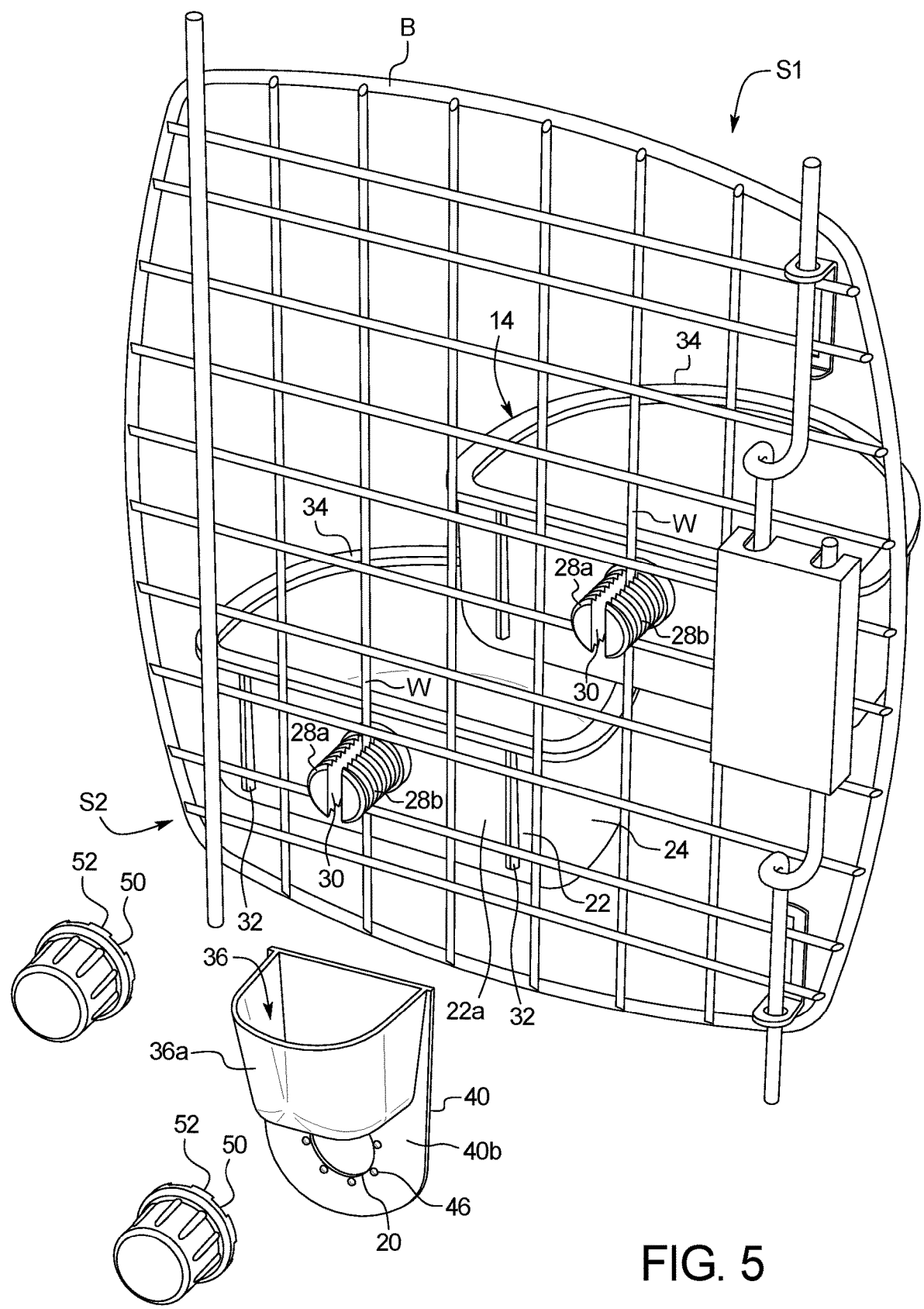
FIG. 5 is a rear perspective view identical to FIG. 4 but with the nuts and the fill cup exploded to show the attachment of the bowls with the barrier.
Figure 6:
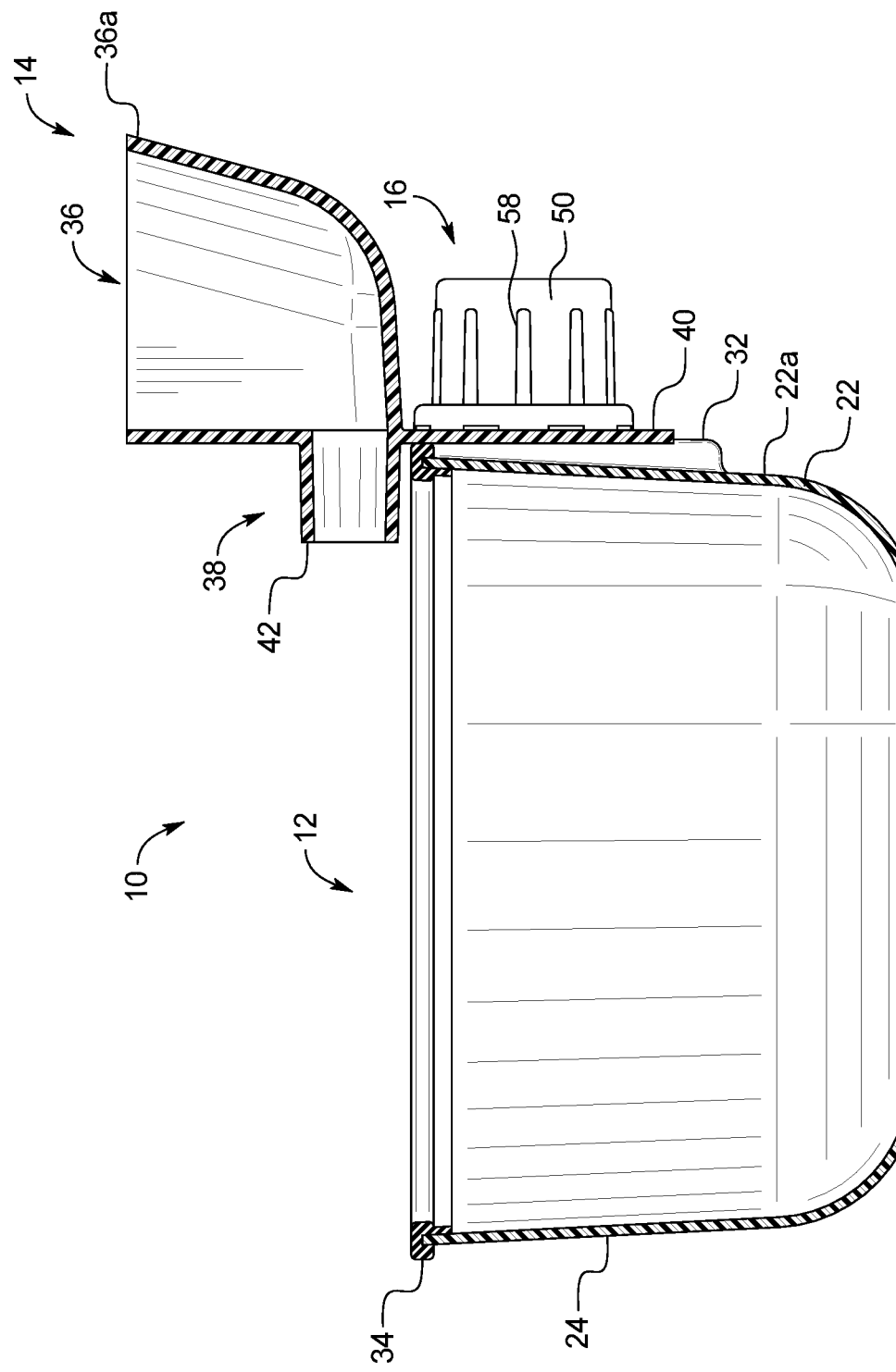
FIG. 6 is a side elevational view of the bowl assembly of FIGS. 1 to 3 as seen along section line 6-6 of FIG. 2.
Figure 7:
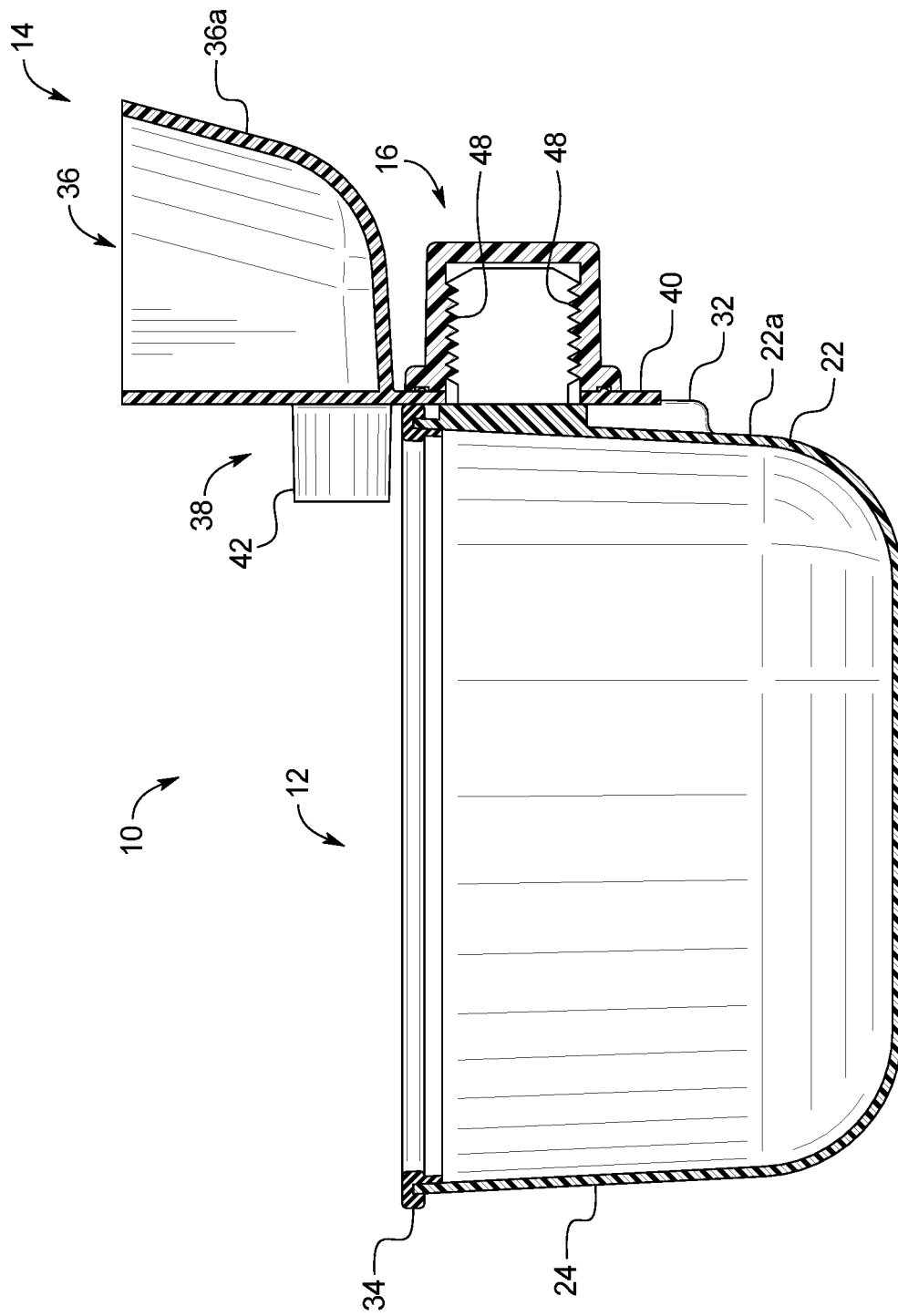
FIG. 7 is a side elevational view of the bowl assembly of FIGS. 1 to 3 as seen along section line 7-7 of FIG. 2

The fastening structure 18 is configured to be received through an opening in the barrier B (e.g., a space between the wires), as best seen in FIG. 5. In the illustrated embodiment, the fastening structure 18 includes first and second threaded portions 28a and 28b having a receiving groove 30 disposed therebetween. Thus, the fastening structure 18 includes threads. As shown in FIG. 6, the receiving groove 30 is configured to receive a portion of the barrier (e.g., a wire W) to secure the bowl 12 to the barrier B. In other words, the fastening structure 18 includes the receiving groove 30 configured to receive the wire W of the barrier B. Accordingly, as best seen in FIG. 5, when the receiving groove 30 receives the wire W, the first threaded portion 28*a* extends through a first opening in the barrier B and the second threaded portion 28*b* extends through a second opening in the barrier B. The first and second threaded portions 28*a* and 28*b* are configured to engage the nut 16.

It will be apparent to those skilled in the art from this disclosure that the fastening structure 18 can having different sizes, lengths, shapes and thicknesses to accommodate barriers of different sizes. The fastening structure 18 can be a one-piece member with the side wall 22. Alternatively, the fastening structure 18 can be formed as a separate member that is bonded to the bowl 12 by conventional methods, such as sonic welding.

The bowl 12 further includes a pair of contact ribs 32 that protrude from the side wall 22. The contact ribs 32 are configured to contact the barrier B when the bowl 12 is installed on the barrier B and provide further stabilization and support. The contact ribs 32 are conventional and will not be discussed in detail herein.

In the illustrated embodiment, the bowl assembly 10 is further provided with a lip 34 configured to be attached to an upper surface of the bowl 12. The lip 34 can made of an elastic material such as rubber to prevent the pet from grazing itself on the upper surface during use. As shown in FIG. 3, the lip 34 has a shape that corresponds to the shape of the bowl 12. The lip 34 can be installed on the bowl 12 in a variety of conventional methods, such as by glue, snap-fit, press-fit or interference fit. Alternatively, the lip 34 is a plastic member having rounded edges. It will be apparent to those skilled in the art from this disclosure that the lip 34 can be a one-piece member with the bowl 12.

The fill cup 14 will now be discussed with reference to FIGS. 2 to 7. As best seen in FIGS. 4 and 5, the fill cup 14 is configured to be supported on the barrier B at the second barrier side S2 of the barrier B that is opposite to the first barrier side S1 where the bowl 12 is supported. In particular, the fill cup 14 is supported on the barrier B by an attachment to the bowl 12 at the fastening area A. The fill cup 14 includes an inlet area 36 for receiving contents and an outlet area 38 for dispensing contents received in the inlet area 36. The fill cup 14 further includes an extended side wall 40 having the receiving opening 20. Preferably, the fill cup 14 is made of lightweight plastic as a one-piece member. However, it will be apparent to those skilled in the art from this disclosure that the fill cup 14 can also be made of rubber and/or stainless steel or any other suitable material.

The extended side wall 40 includes a barrier-facing surface 40*a* and a non-barrier-facing surface 40*a*. The inlet area 36 extends from the non-barrier facing surface 40*b*. As best seen in FIG. 3, the inlet area 36 is disposed at the non-barrier facing surface 40*b* of the fill cup 14 when the fill cup 14 and the bowl 12 are supported on the barrier B. The inlet area 36 includes an arc-shaped wall 36*a*. However, it will be apparent to those skilled in the art from this disclosure that the inlet area 36 can have different sizes and shapes, as desired. The inlet area 36 is configured to receive contents such as food and water which is dispensed through the outlet area 38 and into the bowl 12 when the bowl assembly 10 is installed.

Figure 2:
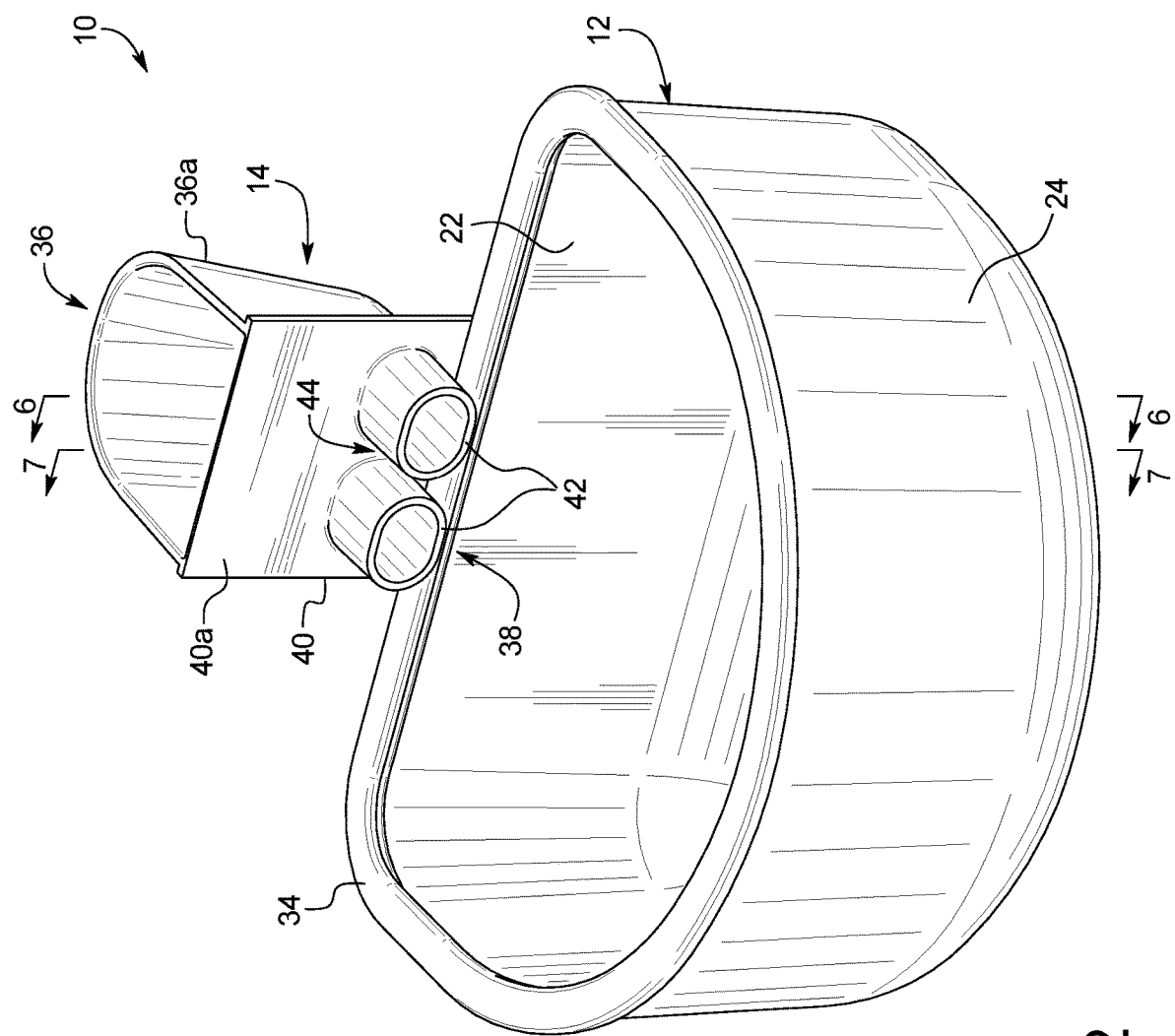
FIG. 2 is a front elevational view of the bowl assembly illustrated in FIG. 1.

As best seen in FIG. 2, the outlet area 38 includes a pair of spigots 42 disposed on the barrier-facing surface 40*a* of the extended side wall 40. In other words, the outlet area 38 is disposed at the barrier-facing surface 40*a* of the fill cup 14. In one embodiment, the spigots 42 are tubular and extend substantially perpendicular from the barrier-facing surface 40*a*. It will be apparent to those skilled in the art from this disclosure that the spigots 42 can have varying shapes and sizes as needed and/or desired. The outlet area 38 further includes a barrier receiving space 44 disposed between the spigots 42. In other words, the fill cup 14 includes the pair of spigots 42 which have the barrier receiving space 44 disposed therebetween. As shown, the barrier receiving space 44 receives the wire W. Although a pair of spigots 42 are shown, it will be apparent to those skilled in the art from this disclosure that the fill cup 14 can include additional or fewer spigots of different shapes and sizes and configurations to accommodate different types of barriers.

As seen in FIGS. 1 and 2, the outlet area 38 of the fill cup 14 is disposed over the bowl 12 when the fill cup 14 and the bowl 12 are supported on the barrier B such that the bowl 12 can receive contents dispensed from the outlet area 38. That is, the spigots 42 of the outlet area 38 extend outwardly away from the barrier-facing surface 40*a* and out over the bowl 12. Thus, a pet owner can dispense food and water to the pet via the fill cup 14 and need not open or unlatch the barrier B (e.g., the carrier doors in FIGS. 1 and 7) in order for the pet to be able to access food and water in the bowl 12.

As stated, the fill cup 14 includes the receiving opening 20 that is configured to receive the fastening structure 18 of the bowl 12. The receiving opening 20 is sized and dimensioned to correspond to the size and dimension of the fastening structure 18. In the illustrated embodiment, the receiving opening 20 is a circular hole in the extended side wall 40 of the fill cup 14 and is disposed below the inlet area 36. As best seen in FIGS. 4 and 5, when the bowl assembly 10 is installed on the barrier B, the fill cup 14 is supported at the receiving opening 20 and secured to the fastening structure 18 by the nut 16. Also, in the illustrated embodiment, the bowl 12 and the fill cup 14 are detachably attached at the fastening area A. For example, as seen in FIG. 4, the bowl 12 can either be supported on the barrier B by the nut 16 without the fill cup 14 or with the fill cup 14. However, it will be apparent to one skilled in the art from this disclosure that the bowl 12 and the fill cup 14 can be fixedly attached. For example, the fill cup 14 can be an elastic member (e.g., a rubber member), and inserted through the opening of the barrier B (e.g., the space between the wires) such that the fill cup 14 and the bowl 12 are disposed on opposite sides of the barrier B.

As best seen in FIG. 3, a plurality of protrusions 46 is provided adjacent a periphery of the receiving opening 20 at the non-barrier facing surface 40*b* of the extended side wall 40. The protrusions 46 are configured to engage the nut 16 to enable a more secure attachment between the fill cup 14, the bowl 12 and the nut 16, as will be further discussed below.

The nut 16 will now be discussed with reference to FIGS. 3 to 7. The nut 16 is configured to engage the fastening structure 18 of the bowl 12. In the illustrated embodiment, when the bowl assembly 10 is assembled to the barrier B, the nut 16 secures the bowl 12 and the fill cup 14 to the barrier B. The nut 16 is preferably a one-piece plastic member sized and dimensioned to correspond to the size and dimension of the fastening structure 18 of the bowl 12. The nut 16 includes a plurality of inner threads 48, an outer grip portion 50, and a plurality of projections and indentations 52 disposed at a rim 54 of the nut 16.

The inner threads 48 are disposed inside a receiving area 56 that receives the fastening structure 18 and are configured to engage the fastening structure 18. Specifically, the inner threads 48 are configured to engage the first and second threaded portions 28*a* and 28*b* of the fastening structure 18 to secure the bowl assembly 10 to the barrier B. The plurality of projections and indentations 52 are configured to engage the protrusions 46 of the fill cup 14. When the nut 16 is rotated in a locking direction, the projections and indentations 52 of the nut 16 are configured to ratchet against the protrusions 46 of the fill cup 14 to enable a more secure attachment. The outer grip portion 50 also includes a plurality of protrusions 58 that are configured to provide more frictional contact with the user's hand during use.

To install the bowl assembly 10 to the barrier B, the user places the bowl 12 against the first barrier side S1 such that the receiving groove 30 receives the wire W therebetween, as seen in FIG. 5. The fastening structure 18 extends from the first barrier side S1 to the second barrier side S2. The fill cup 14 is supported to the fastening structure 18 at the second barrier side S2 by inserting the fastening structure 18 into the receiving opening 20 of the fill cup 14. The nut 16 is secured to the fastening structure 18 and the fill cup 14 by receiving the fastening structure 18 through receiving area 56 of the nut 16. The user then turns the nut 16 in a locking direction so that the inner threads 48 of the nut 16 fixedly engages the first and second threaded portions 28a and 28b of the fastening structure 18. The protrusions and indentations 52 of the nut 16 preferably ratchets against the protrusions 46 that are adjacent the receiving hole 20 to enable a tighter fit.

Thus, as seen in FIGS. 1, 4 and 5, after the bowl assembly 10 is installed on the barrier B, the bowl 12 is supported on the first barrier side S1 and the fill cup 14 is supported on the second barrier side S2. The spigots 42 extend from the second barrier side S2 through openings in the barrier and to the first barrier side S1 to protrude over the lip 34 and above the bowl 12.

It will be apparent to those skilled in the art from this disclosure that the inlet area 36 can include a separation wall (not shown) extending from the extended side wall 40 at a point between the spigots 42 to the arch-shaped wall 36a. Thus, the inlet area 36 can include more than one compartment to receive different contents (e.g., different types of liquid) and that the each of the spigots 42 can receive and dispense different contents from the inlet area 36. With this configuration, the bowl 12 can include separate compartments (similar to that shown in FIG. 9), each of the compartments configured to receive contents from one of the spigots 42. It will also be apparent to those skilled in the art that the spigots 42 can be sized and configured to dispense either food or liquid.

During use, after barrier B is closed, the user inserts contents (e.g., pours liquid) into the inlet area 36 of the fill cup 14 that is on the second barrier side S2. The contents will be dispensed throughout the outlet area 38 via the spigots 42 and enters the bowl 12 so that the pet can access the contents in the bowl 12 from the first barrier side S1. In this way, contents can be dispensed to the bowl 12 via the fill cup 14 in a convenient manner because the owner need not open barrier B to be able to refill the bowl 12. Thus, the risk of the pet escaping due to the opening of the barrier B is avoided.

Figure 8:
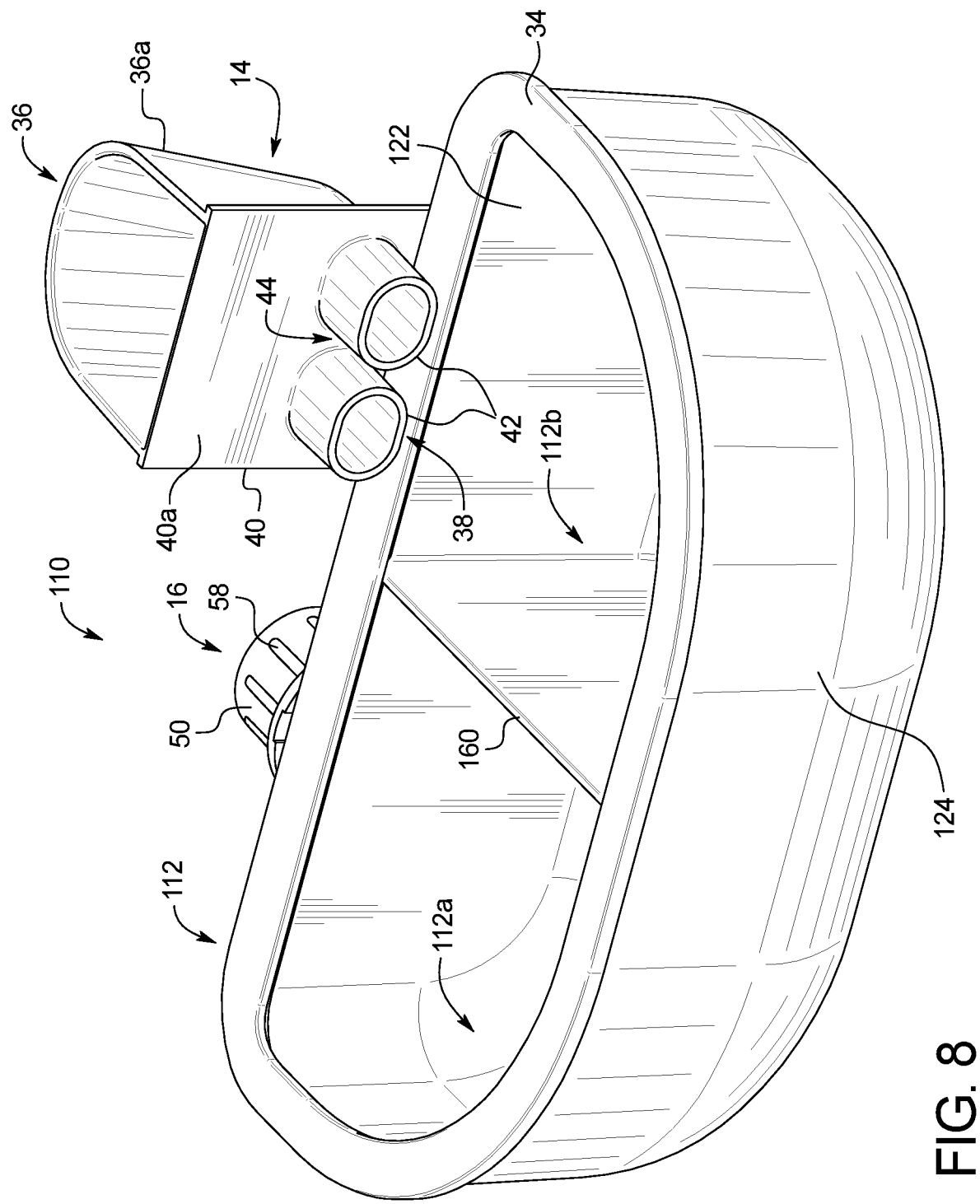
FIG. 8 is a front perspective view of a modified bowl assembly in accordance with an illustrated embodiment.
Figure 9:
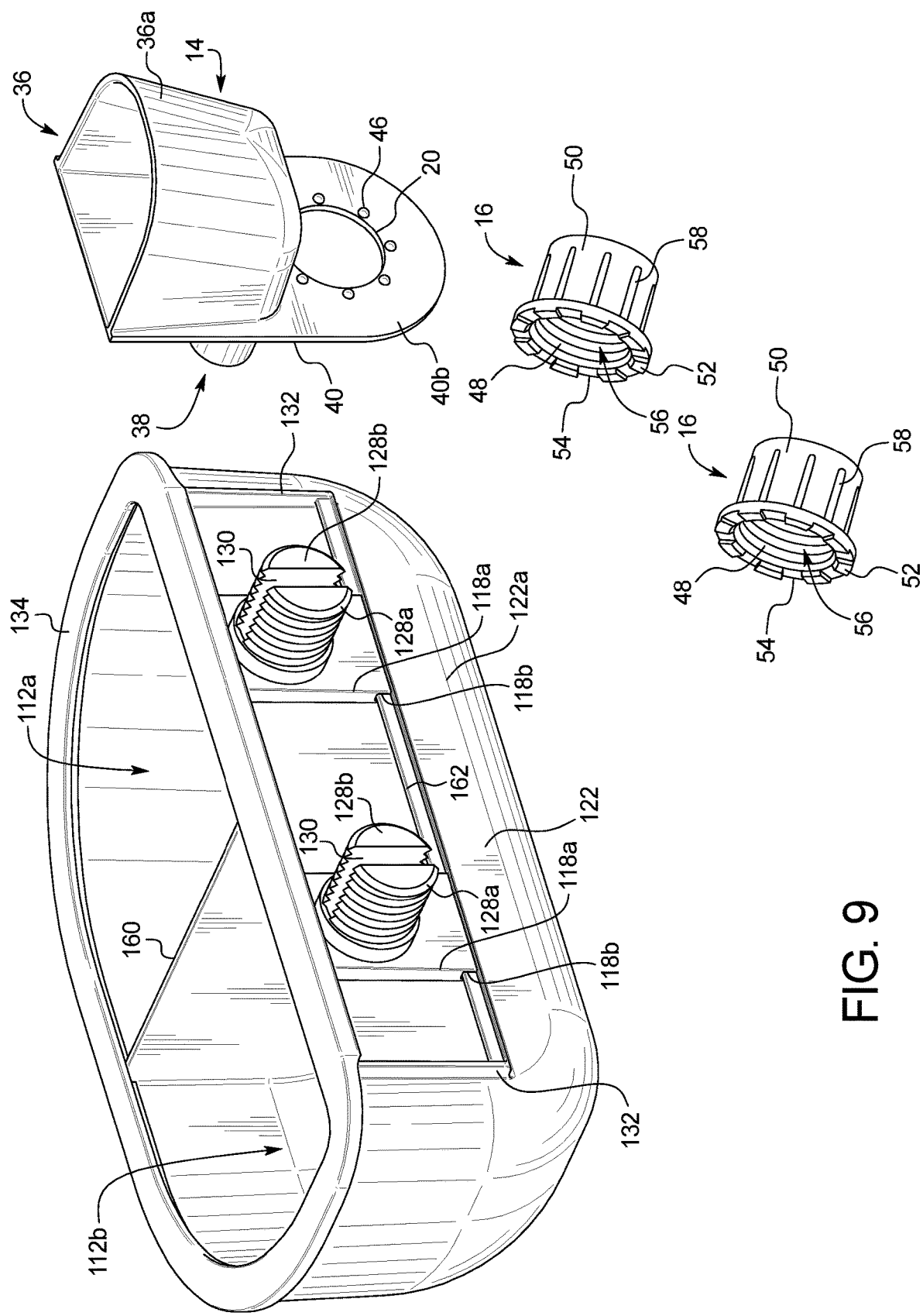
FIG. 9 is a rear perspective view of the modified bowl assembly of FIG. 8 with the nuts and the fill cup exploded.

Referring now to FIGS. 8 and 9, a modified bowl assembly 110 is illustrated. The modified bowl assembly 110 is identical to the bowl assembly 10 assembly of FIGS. 1 to 7, except that it includes a modified bowl 112 that is elongated to include a first feeding area 112a and a second feeding area 112b that are separated by a wall 160. The modified bowl 112 further includes first and second modified fastening structures 118 to provide a more stabilizing effect. Thus, as illustrated, the modified bowl assembly 110 includes the modified bowl 112, the fill cup 14, the nut 16 and an additional identical nut 16. Due to the similarity between the modified bowl assembly 110 and the bowl assembly 10, identical components will receive the same reference numerals as the bowl assembly 10.

The first and second feeding areas 112a and 112b can contain different types of contents. For example, the first feeding area 112a can store food and the second feeding area 112b can contain water for the pet. As illustrated, the fill cup 14 is attached to the modified bowl assembly 110 such that the spigots 42 of the fill cup 14 are disposed over the second feeding area 112b. However, it will be apparent to those skilled in the art from this disclosure that the modified bowl assembly 110 can include an additional fill cup 14 for the first feeding area 112a, as needed and/or desired.

The modified bowl 112 is illustrated as including a pair of the modified fastening structures 118. The modified fastening structures 118 can be formed as a one-piece member with the modified bowl 112. Alternatively, as seen in FIG. 9, each of the modified fastening structures 118 can be formed on a slide block 118a having a recess 118b. The recess 118b engages a rim 162 that extends laterally between the pair of ribs 132. Thus, the modified fastening structures 118 can be detachably attached to the modified bowl 112 and can be adjusted along the rim 162 as needed and/or desired. While the modified bowl assembly 110 is illustrated as including two modified fastening structures 118 and two nuts 16, it will be apparent to those skilled in the art from this disclosure that the modified bowl assembly 110 can include additional feeding areas, modified fastening structures 118 and nuts 16 as needed/and or required.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bowl assembly comprising:
   a bowl configured to be supported on a barrier at a first barrier side; and
   a fill cup configured to be supported on the barrier at a second barrier side that is opposite to the first barrier side, the fill cup and the bowl capable of being connected together through an opening in the barrier, the fill cup including
      an inlet area for receiving contents and
      an outlet area including at least one spigot for dispensing the contents received in the inlet area into the bowl, the outlet area being disposed over the bowl when the fill cup and the bowl are supported on the barrier such that the bowl can receive the contents dispensed from the outlet area,
   the bowl and fill cup being attached at an attachment area of the fill cup that is below the outlet area when the bowl and the fill cup are supported to the barrier, the bowl including a side wall having a barrier-facing surface that includes a fastening structure, the attachment area of the fill cup including a receiving opening that is configured to receive the fastening structure.

2. The bowl assembly according to claim 1, wherein the outlet area is disposed at a barrier-facing surface of the fill cup and the inlet area is disposed at a non-barrier facing surface of the fill cup when the fill cup and the bowl are supported on the barrier.

3. The bowl assembly according to claim 1, wherein the bowl and the fill cup are detachably attached to the barrier.

4. The bowl assembly according to claim 1, wherein the fastening structure includes threads.

5. The bowl assembly according to claim 4, further comprising
   a nut having inner threads that are configured to engage the threads of the fastening structure.

6. The bowl assembly according to claim 1, wherein the barrier is a wire barrier and the fastening structure includes a barrier receiving groove configured to receive a wire of the barrier.

7. The bowl assembly according to claim 1, wherein the bowl is plastic.

8. The bowl assembly according to claim 1, wherein the fill cup is plastic.

9. The bowl assembly according to claim 1, wherein the fill cup is rubber.

10. The bowl assembly according to claim 2, wherein the bowl is a one-piece member.

11. The bowl assembly according to claim 1, wherein the fill cup is a one-piece member.

12. The bowl assembly according to claim 1, wherein the at least one spigot includes a pair of spigots having a barrier receiving space disposed between.

13. The bowl assembly according to claim 1, wherein the at least one spigot is configured to extend from a barrier facing surface of the fill cup through another opening in the barrier.

14. The bowl assembly according to claim 1, wherein the bowl includes a first feeding area and a second feeding area that are separated by a wall.

* * * * *